(12) United States Patent
Nagahama

(10) Patent No.: US 11,256,006 B2
(45) Date of Patent: Feb. 22, 2022

(54) MULTILAYER LIGHT-BLOCKING FILM, AND LIGHT-BLOCKING RING FOR OPTICAL EQUIPMENT, LENS UNIT, AND CAMERA MODULE USING THE SAME

(71) Applicant: KIMOTO CO., LTD., Saitama (JP)

(72) Inventor: Tsuyoshi Nagahama, Saitama (JP)

(73) Assignee: KIMOTO CO, LTD., Saitama (JP)

( * ) Notice: Subject to any disclaimer, the term of this patent is extended or adjusted under 35 U.S.C. 154(b) by 149 days.

(21) Appl. No.: 16/494,572

(22) PCT Filed: Mar. 7, 2018

(86) PCT No.: PCT/JP2018/008732
§ 371 (c)(1),
(2) Date: Sep. 16, 2019

(87) PCT Pub. No.: WO2018/180303
PCT Pub. Date: Oct. 4, 2018

(65) Prior Publication Data
US 2020/0088916 A1 Mar. 19, 2020

(30) Foreign Application Priority Data
Mar. 27, 2017 (JP) .............................. JP2017-061566

(51) Int. Cl.
*G02B 5/22* (2006.01)
*G02B 5/00* (2006.01)
*G02B 7/02* (2021.01)

(52) U.S. Cl.
CPC ............ *G02B 5/003* (2013.01); *G02B 7/021* (2013.01)

(58) Field of Classification Search
CPC .... G02B 5/003; G02B 7/021; G02B 27/0018; G02B 5/00; G02B 7/02; G02B 5/201;
(Continued)

(56) References Cited

U.S. PATENT DOCUMENTS 6,165,698 A 12/2000 Kawamura et al.
7,670,673 B2 * 3/2010 Ono .................. C23C 14/205
428/215

(Continued)

FOREIGN PATENT DOCUMENTS

CN 104297887 A 1/2015
EP 3 525 014 A1 8/2019
(Continued)

OTHER PUBLICATIONS

Search Report dated May 15, 2018 issued in corresponding International application No. PCT/JP2018/008732.

*Primary Examiner* — Balram T Parbadia
(74) *Attorney, Agent, or Firm* — Bacon & Thomas, PLLC

(57) ABSTRACT

There are provided a multilayer light-blocking film and the like whose front and back surfaces are easy to discriminate while they have light-blocking layers having high optical density whose front and back are usually difficult to discriminate. A multilayer light-blocking film 100 has a multilayer structure comprising at least a substrate film 11, a light-blocking layer 21 provided on one major surface 11a side of this substrate film 11, and a light-blocking layer 31 provided on the other major surface 11b side, the light-blocking layer 21 and the light-blocking layer 31 have an optical density of 2.5 or more in total, and the difference between the 60-degree glossiness of the light-blocking layer 21 and the 60-degree glossiness of the light-blocking layer 31 is 0.1% or more and 9.9% or less. The substrate film 11 and the light-blocking layer 21 and/or the light-blocking layer 31 preferably have inclined end surfaces 12, 22, and/or 32 so that a film width increases from the light-blocking layer 21 toward the light-blocking layer 31.

21 Claims, 3 Drawing Sheets

(58) Field of Classification Search
CPC .. G02B 5/22; B32B 7/02; B32B 7/023; B32B 1/08; B32B 2307/406; G03B 9/02; G03B 11/00

See application file for complete search history.

(56) References Cited

U.S. PATENT DOCUMENTS

| | | | |
|---|---|---|---|
| 2007/0236627 | A1 | 10/2007 | Ha et al. |
| 2010/0321952 | A1* | 12/2010 | Coleman .............. G02B 6/0061 362/607 |
| 2013/0065039 | A1* | 3/2013 | Tada ...................... C08K 3/36 428/220 |
| 2013/0222913 | A1* | 8/2013 | Tomoda ................. B05D 5/06 359/513 |
| 2014/0016202 | A1 | 1/2014 | Toshima |
| 2014/0016203 | A1* | 1/2014 | Toshima .............. G02B 5/0226 359/599 |
| 2015/0022896 | A1 | 1/2015 | Cho et al. |
| 2015/0198779 | A1 | 7/2015 | Cho et al. |
| 2018/0134006 | A1* | 5/2018 | Lin ......................... B32B 27/00 |
| 2019/0257981 | A1* | 8/2019 | Togawa .............. G02B 5/0226 |

FOREIGN PATENT DOCUMENTS

| | | |
|---|---|---|
| EP | 3 637 156 A1 | 4/2020 |
| JP | H9-274218 A | 10/1997 |
| JP | H11-301117 A | 11/1999 |
| JP | 2001-081431 A | 3/2001 |
| JP | 2009-003315 A | 1/2009 |
| JP | 2012-133071 A | 7/2012 |
| JP | 2017-015815 A | 1/2017 |
| JP | 63-14194 B2 | 4/2018 |
| WO | 2006-016555 A1 | 5/2008 |
| WO | 2012-132727 A1 | 10/2012 |

* cited by examiner

MULTILAYER LIGHT-BLOCKING FILM, AND LIGHT-BLOCKING RING FOR OPTICAL EQUIPMENT, LENS UNIT, AND CAMERA MODULE USING THE SAME

TECHNICAL FIELD

The present invention relates to a multilayer light-blocking film, and a light-blocking ring for optical equipment, a lens unit, and a camera module using the same.

BACKGROUND ART

A camera module for taking an image of an object and converting it into an image signal is built into electronic equipment, for example, an information communication terminal such as a cellular phone or a smartphone, or a digital camera. This camera module comprises an image pickup device for picking up an image of an object, and a lens unit for forming the image of the object on this image pickup device. The lens unit is usually composed of a combination of a plurality of lenses.

In this type of camera module, it is required to remove unnecessary incident light and reflected light, prevent the occurrence of halation, lens flare, a ghost, and the like, and improve the image quality of a picked-up image. Therefore, lens units, camera modules, and the like having light-blocking members for cutting unnecessary light are proposed.

As such light-blocking members, light-blocking films in which light-blocking layers containing carbon black, a lubricant, fine particles, and a binder resin are formed on both surfaces of a substrate film are proposed (see Patent Literatures 1 and 2).

CITATION LIST

Patent Literature

Patent Literature 1: Japanese Patent Laid-Open No. 9-274218
Patent Literature 2: WO2006/016555

SUMMARY OF INVENTION

Technical Problem

In recent years, modularization has advanced worldwide, and modules have been manufactured and controlled in manufacturing plants in the countries of the world in the form of a lens unit including a plurality of lenses and light-blocking plates stacked in the optical axis direction, a camera module in which an image pickup device is further incorporated into this lens unit, or the like. With this, a light-blocking film or a light-blocking member that is one part of each module is also conveyed, and manufactured and controlled, in each place.

Here, when a light-blocking member having a desired shape is made from a light-blocking film, or when a light-blocking member is incorporated into a module, manufacturing failure such as poor incorporation can be caused unless the front and back surfaces of the light-blocking film or the light-blocking member are discriminated. In these days when transworld modularization advances, it is not easy to promote the thoroughness of the control (the confirmation of the front and back surfaces) of a light-blocking film or a light-blocking member worldwide.

In addition, due to the advancement of the miniaturization and film thinning of camera modules, light-blocking members of extremely small size have been mounted. For a light-blocking film in which black light-blocking layers are provided, when the size is several centimeters square or less, it is extremely difficult to discriminate the front and back of the light-blocking film. Especially, for a light-blocking film having high blackness (in other words, having high optical density), this tendency is significant.

The present invention has been made in view of the above problems. Specifically, it is an object of the present invention to provide a multilayer light-blocking film whose front and back surfaces are easy to discriminate while it has light-blocking layers having high optical density whose front and back are usually difficult to discriminate, and a light-blocking ring for optical equipment, a lens unit, a camera module, and the like using the same.

Solution to Problem

The present inventors have studied diligently from a human engineering approach in order to solve the above problems. As a result, the present inventors have found that the above problems can be solved by differentiating the 60-degree glossinesses of light-blocking layers, and by further allowing the end surfaces to function as marks as needed, and completed the present invention.

Specifically, the present invention provides various specific modes shown below.

(1) A multilayer light-blocking film for optical equipment comprising a multilayer structure comprising at least a first light-blocking layer and a second light-blocking layer, wherein the first light-blocking layer and the second light-blocking layer have an optical density of 2.5 or more in total, and a difference between a 60-degree glossiness of the first light-blocking layer and a 60-degree glossiness of the second light-blocking layer is 0.1% or more and 9.9% or less.

(2) The multilayer light-blocking film for optical equipment according to the above (1), wherein the first light-blocking layer and/or the second light-blocking layer have inclined end surfaces so that a film width increases from the first light-blocking layer toward the second light-blocking layer, and the inclined end surface is exposed in a planar view seen from a normal direction of a major surface of the first light-blocking layer.

(3) The multilayer light-blocking film for optical equipment according to the above (1), wherein the first light-blocking layer and/or the second light-blocking layer have inclined end surfaces so that a film width increases from the second light-blocking layer toward the first light-blocking layer, and the inclined end surface is exposed in a planar view seen from a normal direction of a major surface of the second light-blocking layer.

(4) The multilayer light-blocking film for optical equipment according to any one of the above (1) to (3), wherein a hollow portion is provided in the first black light-blocking layer and/or the second black light-blocking layer, and the first black light-blocking layer and/or the second black light-blocking layer each have an inclined end surface on an inner periphery of the hollow portion.

(5) The multilayer light-blocking film for optical equipment according to any one of the above (2) to (4), wherein an inclination angle between the major surface of the first light-blocking layer or a major surface of the second light-blocking layer and the inclined end surface is 10 to 87°.

(6) The multilayer light-blocking film for optical equipment according to any one of the above (1) to (5), wherein the 60-degree glossiness of the first light-blocking layer is 0.01% or more and 5% or less, the 60-degree glossiness of the second light-blocking layer is more than 10% and less than 15%, and the difference between the 60-degree glossiness of the first light-blocking layer and the 60-degree glossiness of the second light-blocking layer is 0.1% or more and 9.9% or less.

(7) The multilayer light-blocking film for optical equipment according to any one of the above (1) to (5), wherein the 60-degree glossiness of the first light-blocking layer is 0.01% or more and 5% or less, the 60-degree glossiness of the second light-blocking layer is 0.5% or more and less than 10%, and the difference between the 60-degree glossiness of the first light-blocking layer and the 60-degree glossiness of the second light-blocking layer is 0.1% or more and 9.9% or less.

(8) The multilayer light-blocking film for optical equipment according to any one of the above (1) to (7), wherein an optical density of the first light-blocking layer is 1.5 or more and less than 2.5, and an optical density of the second light-blocking layer is 1.5 or more and 6.0 or less.

(9) The multilayer light-blocking film for optical equipment according to any one of the above (1) to (8), comprising a multilayer structure comprising at least a substrate film, the first light-blocking layer provided on one major surface side of the substrate film, and the second light-blocking layer provided on the other major surface side of the substrate film.

(10) The multilayer light-blocking film for optical equipment according to the above (9), wherein the substrate film has a total light transmittance of 80.0 to 99.9%.

(11) The multilayer light-blocking film for optical equipment according to the above (9) or (10), wherein the substrate film has a thickness of 0.5 μm or more and 50 μm or less.

(12) A light-blocking ring for optical equipment, having a ring-shaped outer shape, and comprising a multilayer structure comprising at least a first light-blocking layer and a second light-blocking layer, wherein the first light-blocking layer and the second light-blocking layer have an optical density of 2.5 or more in total, and a difference between a 60-degree glossiness of the first light-blocking layer and a 60-degree glossiness of the second light-blocking layer is 0.1% or more and 9.9% or less.

(13) The light-blocking ring for optical equipment according to the above (12), wherein the first light-blocking layer and/or the second light-blocking layer have inclined end surfaces so that a film width increases from the first light-blocking layer toward the second light-blocking layer, and the inclined end surface is exposed in a planar view seen from a normal direction of a major surface of the first light-blocking layer.

(14) The light-blocking ring for optical equipment according to the above (12) or (13), wherein a hollow portion is provided in the first black light-blocking layer and/or the second black light-blocking layer, and the first black light-blocking layer and/or the second black light-blocking layer each have an inclined end surface on an inner periphery of the hollow portion.

(15) The light-blocking ring for optical equipment according to any one of the above (12) to (14), comprising a multilayer structure comprising at least a substrate film, the first light-blocking layer provided on one major surface side of the substrate film, and the second light-blocking layer provided on the other major surface side of the substrate film.

(16) A lens unit comprising a plurality of lenses and at least one or more light-blocking plates stacked in an optical axis direction of the lenses, wherein at least one or more of the light-blocking plates comprise the multilayer light-blocking film for optical equipment according to any one of the above (1) to (11) and/or the light-blocking ring for optical equipment according to any one of the above (12) to (15).

(17) A camera module comprising at least: a lens unit comprising a plurality of lenses and at least one or more light-blocking plates stacked in an optical axis direction of the lenses; and an image pickup device for picking up an image of an object through the lens unit, wherein at least one or more of the light-blocking plates comprise the multilayer light-blocking film for optical equipment according to any one of the above (1) to (11) and/or the light-blocking ring for optical equipment according to any one of the above (12) to (15).

Advantageous Effects of Invention

According to the present invention, it is possible to provide a multilayer light-blocking film and a light-blocking ring for optical equipment whose front and back are easy to discriminate while they have light-blocking layers having high optical density. By using these multilayer light-blocking film and light-blocking ring for optical equipment, handling properties at a module manufacturing site are improved, and the burden of parts control can be reduced. Therefore, the occurrence of manufacturing failure such as poor incorporation can be suppressed, and the yield can be improved. Therefore, a lens unit, a camera module, and the like using these have excellent productivity and economy.

DESCRIPTION OF EMBODIMENTS

Figure 1:
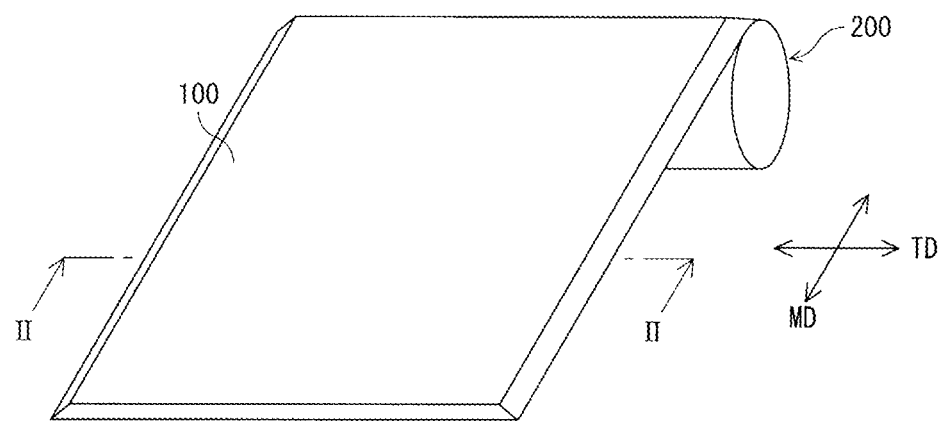
FIG. 1 is a cross-sectional view schematically showing a multilayer light-blocking film and its rolled web in one embodiment.

Embodiments of the present invention will be described in detail below with reference to the drawings. Positional relationships such as top, bottom, left, and right are based on the positional relationships shown in the drawings unless otherwise noted. The dimensional ratios in the drawings are not limited to the ratios shown. However, the following embodiments are illustrations for explaining the present invention, and the present invention is not limited to these. As used herein, for example, the description of the numerical value range "1 to 100" includes both the upper limit value "100" and the lower limit value "1". The same applies to the description of other numerical value ranges.

First Embodiment

Figure 2:
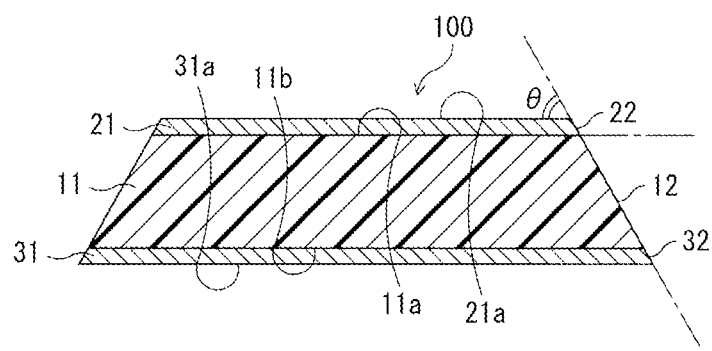
FIG. 2 is a view of the II-II cross section in FIG. 1.
Figure 3:
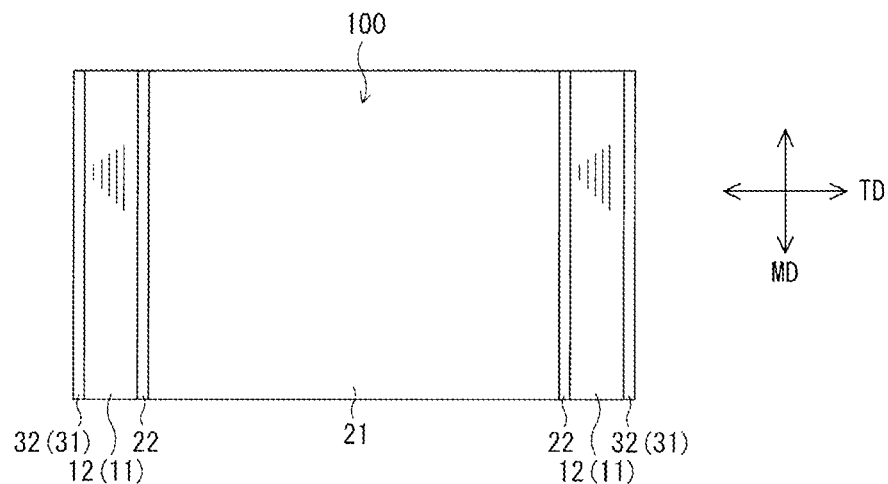
FIG. 3 is a plan view of the multilayer light-blocking film in one embodiment.

FIG. 1 is a cross-sectional view schematically showing a multilayer light-blocking film 100 and its web roll 200 in a first embodiment of the present invention, and FIG. 2 is a cross-sectional view showing the main part of the multilayer light-blocking film 100 (the II-II cross section in FIG. 1). FIG. 3 is a plan view of the multilayer light-blocking film 100. This multilayer light-blocking film 100 comprises at least a substrate film 11, a first light-blocking layer 21 provided on one major surface 11a side of this substrate film 11, and a second light-blocking layer 31 provided on the other major surface 11b side. The multilayer light-blocking film 100 has a multilayer structure (three-layer structure) in which the light-blocking layer 21, the substrate film 11, and the light-blocking layer 31 are at least arranged in this order. In this multilayer structure, the first light-blocking layer 21 is disposed on the outermost surface on the front side, and the second light-blocking layer 31 is disposed on the outermost surface on the back side, and as shown in FIG. 2, the first and second light-blocking layers 21 and 31 are disposed on the outermost surfaces on the front side and the back side respectively in an exposed state. By winding this multilayer light-blocking film 100 in the form of a cored or coreless roll, the rolled web 200 that is a wound body is formed.

As used herein, "provided on one (the other) major surface side of the substrate film" means including not only a mode in which the light-blocking layer 21 or 31 is directly placed on a surface (for example, the major surface 11a or the major surface 11b) of the substrate film 11 as in this embodiment, but a mode in which an optional layer (for example, a primer layer or an adhesive layer) is interposed between a surface of the substrate film 11 and the light-blocking layer 21 or 31. A multilayer structure comprising at least the first light-blocking layer 21 and the second light-blocking layer 31 means including not only a structure in which only the first light-blocking layer 21 and the second light-blocking layer 31 are directly layered, but the above-described three-layer structure and a multilayer structure of four or more layers in which an optional layer or optional layers are further provided in a three-layer structure.

The type of the substrate film 11 is not particularly limited as long as it can support the light-blocking layers 21 and 31. From the viewpoint of dimensional stability, mechanical strength, weight reduction, and the like, synthetic resin films are preferably used. Specific examples of the synthetic resin films include polyester films, ABS (acrylonitrile-butadiene-styrene) films, polyimide films, polystyrene films, and polycarbonate films. Acrylic, polyolefin-based, cellulosic, polysulfone-based, polyphenylene sulfide-based, polyethersulfone-based, and polyetheretherketone-based films can also be used. Among these, as the substrate film 11, polyester films and polyimide films are preferably used. Especially, uniaxially or biaxially stretched films, particularly biaxially stretched polyester films, have excellent mechanical strength and dimensional stability and therefore are particularly preferred. For heat-resistant applications, uniaxially or biaxially stretched polyimide films are particularly preferred. One of these can be used alone, and two or more of these can also be used in combination.

The thickness of the substrate film 11 can be appropriately set according to the required performance and the application and is not particularly limited. From the viewpoint of weight reduction and film thinning, the thickness of the substrate film 11 is preferably 0.5 μm or more and 50 μm or less, more preferably 1 μm or more and 25 μm or less, further preferably 4 μm or more and 10 μm or less, and particularly preferably 5 μm or more and 7 μm or less. From the viewpoint of improving adhesiveness to the light-blocking layers 21 and 31, the surfaces of the substrate film 11 can also be subjected to various known surface treatments such as anchor treatment and corona treatment as needed.

Inclined end surfaces 12 are provided on the outer peripheral side surfaces (outer peripheral end surfaces) of the substrate film 11. Due to these inclined end surfaces 12, the cross-sectional structure of the substrate film 11 has a trapezoidal shape in which the lower base is longer than the upper base, so that the film width of the substrate film 11 increases from the light-blocking layer 21 toward the light-blocking layer 31 (see FIG. 2).

These inclined end surfaces 12 are provided so as to be exposed in a planar view from the normal direction of the major surface 11a of the substrate film 11 so as to be visible from the major surface 11a side of the substrate film 11 when the substrate film 11 is brought into a flat state as shown in FIG. 2 (see FIG. 3). Specifically, the inclination angle θ (depression angle θ) between the major surface 11a and the inclined end surface 12 of the substrate film 11 is set to be 10 to 87°. From the viewpoint of improving the visibility of the inclined end surfaces 12 in a planar view from the major surface 11a side, maintaining the strength of the end surfaces of the substrate film 11, maintaining productivity, and the like, the inclination angle θ is preferably 30 to 85°, more preferably 40 to 83°, and further preferably 45 to 80°. As long as the inclined end surfaces 12 are visible from the major surface 11a side of the substrate film 11, for example, transparent or semitransparent protective layers or the like may be provided on the inclined end surfaces 12 for film end surface strengthening.

The appearance of the substrate film 11 may be any of transparent, semitransparent, and opaque appearance and is not particularly limited. For example, foamed synthetic resin films such as foamed polyester films, and synthetic resin films in which black pigments such as carbon black or other pigments are contained can also be used. From the viewpoint of improving the visibility of the inclined end surfaces 12 in a planar view from the major surface 11a side, the substrate film 11 preferably has a total light transmittance of 80.0 to 99.9%, more preferably 83.0 to 99.0%, and further preferably 85.0 to 99.0%.

The light-blocking layers 21 and 31 are light-blocking films having an optical density (OD) of 2.5 or more in total, and the difference between the 60-degree glossiness of the light-blocking layer 21 and the 60-degree glossiness of the light-blocking layer 31 is set to be 0.1% or more and 9.9% or less, preferably 0.5% or more and 8% or less, and further preferably 1% or more and 6% or less.

As used herein, the optical density (OD) is a value obtained by measuring in accordance with JIS-K7651: 1988 using an optical densitometer (TD-904: GretagMacbeth) and a UV filter. From the viewpoint of having higher light-blocking properties, the light-blocking layers 21 and 31 each preferably have an optical density (OD) of 1.5 or more for a single layer and each more preferably have an optical density (OD) of 1.7 or more for a single layer. When the light-blocking layers 21 and 31 are layered, the optical density (OD) of the layered body is preferably 2.5 to 6.0, more preferably 4.5 to 6.0, further preferably 5.0 to 6.0. At this time, for example, when a layered body having an optical density of 2.5 to 6.0 in total is formed using the light-blocking layer 21 having an optical density of 1.5 or more and less than 2.5, and the light-blocking layer 31 having an optical density of 1.5 or more and 6.0 or less, to provide different optical densities on the front and back surfaces of the multilayer structure, the discrimination of the front and back surfaces is clearer, which is preferred. When higher light-blocking properties are required, for example, a layered body having an optical density (OD) of 4.5 to 6.0 in total can also be formed using the light-blocking layers 21 and 31 having an optical density (OD) of 2.5 or more and 6.0 or less.

The 60-degree glossiness is a value obtained by measuring the glossiness (specular glossiness) (%) of the surface of the light-blocking layer 21 or 31 at incidence and acceptance angles of 60° in accordance with JIS-Z8741: 1997 using a digital variable angle glossmeter (UGV-5K: manufactured by Suga Test Instruments Co., Ltd.). At this time, from the viewpoint of suppressing the reflection of incident light and increasing light absorption properties, the light-blocking layer 21 preferably has a 60-degree glossiness of 0.01% or more and 5.0% or less, more preferably 0.05 to 3.0%, further preferably 0.1 to 1%. On the other hand, from the viewpoint of suppressing the reflection of incident light, and increasing light absorption properties, and at the same time increasing the visual discriminability of the front and back surfaces, and the like, the light-blocking layer 31 preferably has a 60-degree glossiness of more than 10% and less than 15%, more preferably more than 10% and 14% or less, and further preferably more than 10% and 13% or less. Alternatively, from the viewpoint of suppressing light scattering as low gloss, and the like, the light-blocking layer 31 preferably has a 60-degree glossiness of 0.5% or more and less than 10%, more preferably 1% or more and 7% or less, and further preferably 1.5% or more and 5% or less.

One of preferred modes is a mode in which the 60-degree glossiness of one of the light-blocking layers 21 and 31 is 10% or more, and the 60-degree glossiness of the other is less than 10%, and one surface has low gloss. Specific examples include a mode in which the 60-degree glossiness of the light-blocking layer 21 is 0.01% or more and 5% or less, the 60-degree glossiness of the light-blocking layer 31 is more than 10% and less than 15%, and the difference between the 60-degree glossiness of the light-blocking layer 21 and the 60-degree glossiness of the light-blocking layer 31 is more than 5% and 9.9% or less.

One of other preferred modes is a mode in which the 60-degree glossinesses of the light-blocking layers 21 and 31 are both less than 10%, and both surfaces have low gloss. Specific examples include a mode in which the 60-degree glossiness of the light-blocking layer 21 is 0.01% or more and 5% or less, the 60-degree glossiness of the light-blocking layer 31 is 0.5% or more and less than 10%, and the difference between the 60-degree glossiness of the light-blocking layer 21 and the 60-degree glossiness of the light-blocking layer 31 is 0.1% or more and 9.9% or less.

As a material of the light-blocking film having such properties (light-blocking layers 21 and 31), those known in the industry can be used, and the type of the light-blocking film is not particularly limited. As the light-blocking film having high optical density, a dark light-blocking film provided with one or more dark pigments or dyes such as black, gray, purple, blue, brown, red, and green pigments or dyes is preferably used. For example, as the black-based light-blocking film, a black light-blocking film (in other words, a black light-blocking layer 31 or 32) containing at least a binder resin and a black pigment, and a dark pigment or dye blended as needed is preferably used. This black light-blocking film will be described in detail below as an example.

Examples of the binder resin include, but are not particularly limited to, thermoplastic resins or thermosetting resins such as poly(meth)acrylic acid-based resins, polyester-based resins, polyvinyl acetate-based resins, polyvinyl chloride-based resins, polyvinyl butyral-based resins, cellulosic resins, polystyrene/polybutadiene resins, polyurethane-based resins, alkyd resins, acrylic resins, unsaturated polyester-based resins, epoxy ester-based resins, epoxy-based resins, epoxy acrylate-based resins, urethane acrylate-based resins, polyester acrylate-based resins, polyether acrylate-based resins, phenolic resins, melamine-based resins, urea-based resins, and diallyl phthalate-based resins. Thermoplastic elastomers, thermosetting elastomers, ultraviolet curable resins, electron beam curable resins, and the like can also be used. One of these can be used alone, and two or more of these can also be used in combination. The binder resin can be appropriately selected and used according to the required performance and the application. For example, in applications where heat resistance is required, thermosetting resins are preferred.

The content (total amount) of the binder resin in the light-blocking layer 21 or 31 is not particularly limited but is preferably 40 to 90% by mass, more preferably 50 to 85% by mass, and further preferably 60 to 80% by mass from the viewpoint of adhesiveness, light-blocking properties, scratch resistance, sliding properties, flatting properties, and the like.

The black pigment colors the binder resin black to provide light-blocking properties. Specific examples of the black pigment include, but are not particularly limited to, black resin particles, magnetite-based black, copper-iron-manganese-based black, titanium black, and carbon black. Among these, black resin particles, titanium black, and carbon black are preferred because of excellent concealing properties, and carbon black is more preferred. One of these can be used alone, and two or more of these can also be used in combination. Similarly, the dark pigment or dye blended as needed should also be appropriately selected and used from among known ones.

As the carbon black, those made by various known manufacturing methods, such as oil furnace black, lamp black, channel black, gas furnace black, acetylene black, thermal black, and ketjen black, are known, but the type of the carbon black is not particularly limited. From the viewpoint of providing conductivity to the light-blocking layer 21 or 31 to prevent electrostatic charging, conductive carbon black is particularly preferably used. The history of carbon black is old, and various grades of carbon black simple substances and carbon black dispersions are commercially available from, for example, Mitsubishi Chemical Corporation, Asahi Carbon Co., Ltd., MIKUNI COLOR LTD., RESINO COLOR INDUSTRY CO., LTD., Cabot, and DEGUSSA. The carbon black should be appropriately selected from among these according to the required performance and the application. The particle size of the carbon black can be appropriately set according to the required performance and the like and is not particularly limited. The average particle diameter $D_{50}$ of the carbon black is preferably 0.01 to 2.0 μm more preferably 0.05 to 0.1 μm, and further preferably 0.08 to 0.5 μm. The average particle diameter herein means a volume-based median diameter ($D_{50}$) measured by a laser diffraction particle size distribution measuring apparatus (for example, SHIMADZU CORPORATION: SALD-7000).

The content (total amount) of the black pigment in the light-blocking layer 21 or 31 is not particularly limited but is preferably 10 to 60% by mass, more preferably 15 to 50% by mass, and further preferably 20 to 40% by mass in terms of solids based on all resin components contained in the light-blocking layer 21 or 31 (phr) from the viewpoint of dispersibility, film-forming properties, handling properties, adhesiveness, slip properties, flatting properties, abrasion resistance, and the like.

The thicknesses of the light-blocking layers 21 and 31 can be appropriately set according to the required performance and the application and are not particularly limited. From the viewpoint of high optical density, weight reduction, and film thinning, the thicknesses of the light-blocking layers 21 and 31 are each preferably 0.1 µm or more, more preferably 0.2 µm or more, further preferably 0.5 µm or more, and particularly preferably 1 µm or more and preferably 15 µm or less, more preferably 12 µm or less, further preferably 9 µm or less, and particularly preferably 6 µm or less on the upper limit side.

From the viewpoint of weight reduction and film thinning, the total thickness of the multilayer light-blocking film 100 is preferably 0.5 µm or more and 50 µm or less, more preferably 1 µm or more, and further preferably 5 µm or more, and more preferably 40 µm or less, and further preferably 25 µm or less.

One feature of the multilayer light-blocking film 100 in this embodiment is that from a human engineering approach, a configuration in which in the light-blocking layer 21 and the light-blocking layer 31 having an optical density of 2.5 or more in total, the difference in 60-degree glossiness is 0.1% or more and 9.9% or less is adopted. By differentiating the 60-degree glossiness in this manner, the front and back of the multilayer light-blocking film 100 can be discriminated in a noncontact manner, that is, visually, based on the difference in glossy feeling and luster.

At this time, the difference between the 60-degree glossiness of the light-blocking layer 21 and the 60-degree glossiness of the light-blocking layer 31 should be appropriately set considering the balance of the visual discriminability of the front and back surfaces and the optical density (light-blocking properties) and is not particularly limited but is preferably 9% or more and 40% or less, more preferably 0.5% or more and 8% or less, and further preferably 1% or more and 6% or less. In order to provide such a difference in 60-degree glossiness, for example, the 60-degree glossiness of the light-blocking layer 21 should be 0.01% or more and 5% or less, and the 60-degree glossiness of the light-blocking layer 31 should be more than 10% and less than 15%, or the 60-degree glossiness of the light-blocking layer 21 should be 0.01% or more and 5% or less, and the 60-degree glossiness of the light-blocking layer 31 should be 0.5% or more and less than 10%, as described above.

The method for adjusting the 60-degree glossinesses of the light-blocking layer 21 and the light-blocking layer 31 includes, but is not particularly limited to, a method of differentiating the content of the black pigment between the light-blocking layer 21 and the light-blocking layer 31, a method of using black pigments having different blacknesses for the light-blocking layer 21 and the light-blocking layer 31, a method of using black pigments of different sizes for the light-blocking layer 21 and the light-blocking layer 31, a method of differentiating surface roughness between the light-blocking layer 21 and the light-blocking layer 31, a method of using binder resins having different hues for the light-blocking layer 21 and the light-blocking layer 31, a method of using a black pigment and a dark pigment or dye in combination for only one of the light-blocking layer 21 and the light-blocking layer 31, and a method of differentiating the types of the black pigment and the dark pigment or dye used, between the light-blocking layer 21 and the light-blocking layer 31. It is also possible to adjust lightness, hue, and/or saturation by blending various known additives used in light-blocking films. For these adjustment methods, the various methods can each be performed alone or can be performed in appropriate combination.

On the outer peripheral side surfaces of the light-blocking layer 21 or 31, inclined end surfaces 22 or 32 (outer peripheral end surfaces 22 or 32) having an inclination angle θ corresponding to that of the above-described inclined end surfaces 12 are provided on both side surfaces (two places). These inclined end surfaces 22 and 32 are provided so as to be exposed in a planar view from the normal direction of the major surface 21a of the light-blocking layer 21 so as to be visible from the major surface 21a side of the light-blocking layer 21 when the light-blocking layers 21 and 31 are brought into a flat state as shown in FIG. 2 (see FIG. 3). Specifically, the inclination angle θ between the major surface 21a of the light-blocking layer 21 and the inclined end surface 22 or 32 is set to be 10 to 87°. As long as the inclined end surfaces 22 and 32 are visible from the major surface 21a side of the light-blocking layer 21, for example, transparent or semitransparent protective layers or the like may be provided on the inclined end surfaces 22 and 32 for film end surface strengthening. By configuring the light-blocking layers 21 and 31 in this manner and using the difference in hue, saturation, lightness, transparency, 60-degree glossiness, total light transmittance, or the like between the substrate film 11 and the light-blocking layers 21 and 31, the discriminability of the light-blocking layers 21 and 31 improves further. Here, the inclination angle θ of the inclined end surface 22 or 32 is not particularly limited but is preferably 10 to 87°, more preferably 35 to 85°, further preferably 40 to 83°, and particularly preferably 45 to 80° like the inclined end surface 12. By setting an inclination angle equal or nearly equal to that of the inclined end surface 12, the end surface strength tends to be easily maintained high, and the productivity tends to be easily improved.

The light-blocking layers 21 and 31 may contain various additives known in the industry. Specific examples thereof include, but are not particularly limited to, matting agents (flatting agents), lubricants, conductive agents, flame retardants, antimicrobial agents, fungicides, antioxidants, plasticizers, leveling agents, flow-adjusting agents, antifoaming agents, and dispersing agents. Examples of the matting agents include, but are not particularly limited to, organic fine particles such as crosslinked polymethyl methacrylate particles and crosslinked polystyrene particles, and inorganic fine particles such as silica, magnesium aluminometasilicate, and titanium oxide. Examples of the lubricants include, but are not particularly limited to, hydrocarbon-based lubricants such as polyethylene, paraffins, and waxes; fatty acid-based lubricants such as stearic acid and 12-hydroxystearic acid; amide-based lubricants such as stearic acid amide, oleic acid amide, and erucic acid amide; ester-based lubricants such as butyl stearate and stearic acid monoglyceride; alcohol-based lubricants; solid lubricants such as metallic soaps, talc, and molybdenum disulfide; silicone resin particles, and particles of fluororesins such as polytetrafluoroethylene waxes and polyvinylidene fluoride. Among these, particularly organic lubricants are preferably used. When an ultraviolet curable resin or an electron beam curable resin is used as the binder resin, for example, a sensitizer such as n-butylamine, triethylamine, or tri-n-butylphosphine, and an ultraviolet absorbing agent may be used. One of these can be used alone, and two or more of these can also be used in combination. The content of these is not particularly limited, but the content of each is generally preferably 0.01 to 5% by mass in terms of solids based on all resin components contained in the light-blocking layer 21 or 31.

In addition, the light-blocking layers 21 and 31 preferably have a visible light reflectance of 10.0% or less. Here, the visible light reflectance means relative total light reflectance when light is allowed to enter at an incidence angle of 8° to the light-blocking layer 21 or 31 using a spectrophotometer (spectrophotometer SolidSpec-3700 manufactured by SHIMADZU CORPORATION, or the like) and barium sulfate as a standard plate. From the viewpoint of having higher light-blocking properties, and the like, the visible light reflectances of the light-blocking layers 21 and 31 are more preferably 8% or less, further preferably 6% or less, and particularly preferably 4% or less. From the viewpoint of increasing the discriminability of the light-blocking layers 21 and 31, the difference in visible light reflectance between the light-blocking layer 21 and the light-blocking layer 31 is preferably 1%. As the multilayer light-blocking film 100, the diffuse reflectance in the range of infrared light (800 to 1000 nm) other than visible light is preferably 10% or less, more preferably 8% or less, further preferably 6% or less, and particularly preferably 4% or less.

Further, the light-blocking layers 21 and 31 preferably have a surface resistivity of less than $1.0 \times 10^8 \Omega$, more preferably less than $1.0 \times 10^5 \Omega$, and further preferably less than $5.0 \times 10^4 \Omega$ from the viewpoint of having sufficient antistatic performance. As used herein, the surface resistivity is a value measured in accordance with JIS-K6911: 1995.

The method for manufacturing the multilayer light-blocking film 100 is not particularly limited as long as one having the above-described configuration is obtained. From the viewpoint of manufacturing the light-blocking layers 21 and 31 on the substrate film 11 with good reproducibility, simply, and at low cost, conventionally known application methods such as doctor coating, dip coating, roll coating, bar coating, die coating, blade coating, air knife coating, kiss coating, spray coating, and spin coating are preferably used.

For example, the light-blocking layer 21 or 31 can be formed on the substrate film 11 by applying onto a major surface of the substrate film 11 an application liquid containing in a solvent the binder resin and the black pigment described above and additives as optional components blended as needed, drying the application liquid, and then performing heat treatment, pressurization treatment, and the like as needed. As the solvent of the application liquid used here, water; ketone-based solvents such as methyl ethyl ketone, methyl isobutyl ketone, and cyclohexanone; ester-based solvents such as methyl acetate, ethyl acetate, and butyl acetate; ether-based solvents such as methyl cellosolve and ethyl cellosolve; alcohol-based solvents such as methyl alcohol, ethyl alcohol, and isopropyl alcohol, and mixed solvents thereof, and the like can be used. In order to improve the adhesion between the substrate film 11 and the light-blocking layer 21 or 31, anchor treatment, corona treatment, or the like can also be performed as needed. Further, an intermediate layer such as a primer layer or an adhesive layer can also be provided between the substrate film 11 and the light-blocking layer 21 or 31 as needed. The multilayer light-blocking film 100 having the desired shape can also be simply obtained by various known forming methods such as compression molding, injection molding, blow molding, transfer molding, and extrusion. Once a sheet shape is formed, then vacuum forming, pressure forming, or the like can also be performed.

The method for forming the inclined end surfaces 12, 22, and 32 is not particularly limited either. The inclined end surfaces 12, 22, and 32 having any inclination angle θ can be made by appropriately applying various known methods. For example, the inclined end surfaces 12, 22, and 32 can be simply provided by providing a multilayer light-blocking film in which the light-blocking layer 21 and the light-blocking layer 31 are provided on the substrate film 11, and cutting off (cutting out) its outer peripheral side surfaces at the above-described inclination angle. When the inclined end surfaces 22 and 32 are unnecessary, it is recommended to provide the substrate film 11 previously provided with the inclined end surfaces 12 having any inclination angle θ and provide the light-blocking layer 21 and the light-blocking layer 31 on this substrate film 11.

Operation

In the multilayer light-blocking film 100 and the web roll 200 in this embodiment, the first light-blocking layer 21 and the second light-blocking layer 31 having an optical density of 2.5 or more in total, wherein the difference in 60-degree glossiness is 0.1% or more and 9.9% or less are adopted. Therefore, by using these as a light-blocking member for optical equipment such as a lens unit or a camera module, unnecessary incident light and reflected light can be removed, the occurrence of halation, lens flare, a ghost, and the like can be prevented, and the image quality of a picked-up image can be improved.

Moreover, in the above-described multilayer structure, the difference in 60-degree glossiness between the first light-blocking layer 21 and the second light-blocking layer 31 exposed on the front and back surfaces is adjusted at 0.1% or more and 9.9% or less, and therefore the discrimination of the front and back surfaces can be easily performed in a noncontact manner, that is, visually, based on the differences in glossy feeling and luster between the first light-blocking layer 21 and the second light-blocking layer 31. In addition, the inclined end surfaces 12 visibly exposed in a planar view are recognizable as bright portions having a glossy feeling and luster, and therefore the discrimination of the front and back surfaces of the multilayer light-blocking film 100 can be especially easily performed in a noncontact manner, that is, visually. This is due to the difference in hue, saturation, lightness, transparency, 60-degree glossiness, total light transmittance, or the like between the first light-blocking layer 21 or the second light-blocking layer 31 and the inclined end surfaces 12 (the substrate film 11).

Also when the multilayer light-blocking film 100 and the web roll 200 in this embodiment are handled in a dark place, the inclined end surfaces 12 function effectively. In other words, the inclined end surfaces 12 (the substrate film 11) are clearly recognizable as bright portions having a glossy feeling and luster, even with a little light, due to the difference from the first light-blocking layer 21 and the second light-blocking layer 31. In addition, the discrimination of the front and back surfaces can also be performed by directly touching the inclined end surface 12 with fingers or the like to confirm its inclination direction.

Modifications

The present invention can be carried out by making any changes without departing from the spirit thereof. For example, only the inclined end surfaces 12 may be provided without providing the inclined end surfaces 22 and 32. In addition, for the place where the inclined end surface 12 is formed, the inclined end surface 12 should be provided on at least part of the outer peripheral side surfaces of the substrate film 11. Further, the inclined end surface 12 may be provided on both side surfaces (two places) of the substrate film 11 so as to extend in the MD direction of the multilayer light-blocking film 100 as in this embodiment, or provided on one side surface (one place) or both side surfaces (two places) of the substrate film 11 so as to extend in the TD direction of the substrate film 11. Alternatively, the inclined end surfaces 12 may be provided over all of the outer peripheral side surfaces (entire periphery) of the substrate film 11. In addition, the inclined end surfaces 12 extending in the MD direction and/or the TD direction may be continuously formed as in this embodiment and may be intermittently formed. Further, in the above-described embodiment, a mode in which the light-blocking layer 21 and the light-blocking layer 31 are provided on the front and back of the substrate film 11 has been shown, but a multilayer structure (two-layer structure) of the light-blocking layer 21 and the light-blocking layer 31 may be provided without providing the substrate film 11. In addition, the above-described multilayer structure should be in a state in which the light-blocking layer 21 and the light-blocking layer 31 are exposed on the front and back surfaces during the handling of the multilayer light-blocking film 100, and additional layers such as protective layers and other light-blocking layers may be formed so as to cover the exposed surfaces of the light-blocking layer 21 and the light-blocking layer 31, during subsequent use and mounting. Further, the light-blocking layer 21 or 31 may be formed of two or more light-blocking films. For example, a multilayer light-blocking layer in which a light-blocking film 21a and a light-blocking film 21b are layered can be applied as the light-blocking layer 21. The same applies to the light-blocking layer 31. At this time, the above-described various performances and physical properties required of the light-blocking layer 21 should be satisfied as the layered body of the light-blocking film 21a and the light-blocking film 21b. The same applies to the light-blocking layer 31. In the above embodiment, an example in which the inclined end surfaces 12 are provided so that the film width of the substrate film 11 increases from the light-blocking layer 21 toward the light-blocking layer 31 has been shown, but the inclined end surfaces 12 may be provided so that the film width of the substrate film 11 increases from the light-blocking layer 31 toward the light-blocking layer 21.

Second Embodiment

Figure 4:
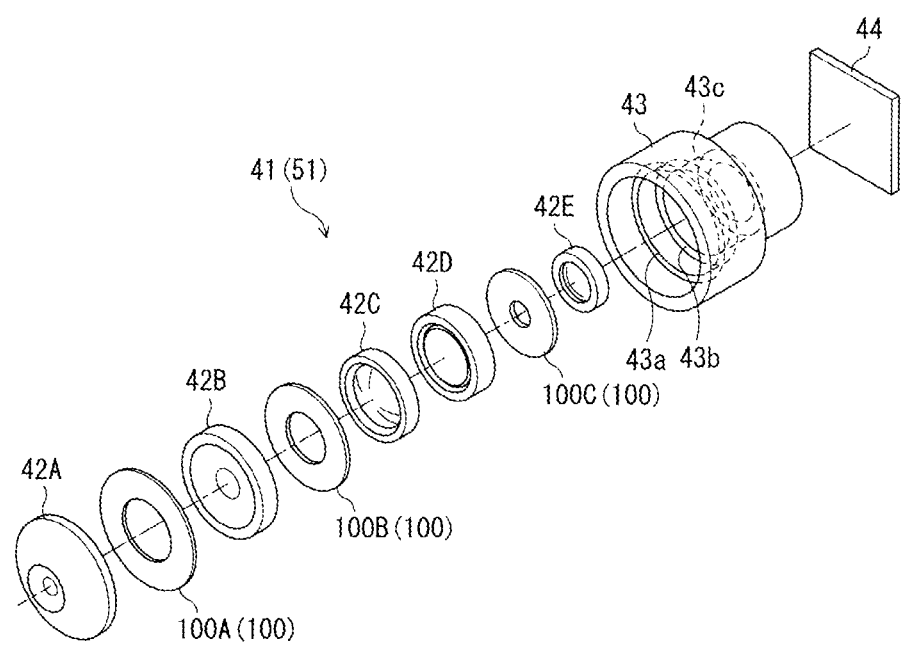
FIG. 4 is an exploded perspective view schematically showing light-blocking rings for optical equipment (multilayer light-blocking films), and a lens unit and a camera module using the same, in one embodiment.

FIG. 4 is an exploded perspective view schematically showing a lens unit 41 and a camera module 51 in a second embodiment of the present invention. The lens unit 41 is composed of a lens group 42 (lenses 42A, 42B, 42C, 42D, 4·BR>QD, and 42E), a multistage cylindrical holder 43, and light-blocking rings 100A, 100B, and 100C for optical equipment (the multilayer light-blocking films 100) as light-blocking spacers. A plurality of height difference portions 43a, 43b, and 43c are provided in the inner peripheral portion of the holder 43. Using these height difference portions 43a, 43b, and 43c, the lens group 42 and the light-blocking rings 100A, 100B, and 100C for optical equipment are housed and disposed at predetermined positions in the holder 43 in a state of being coaxially (on the same optical axis) disposed and stacked. Here, as the lenses 42A, 42B, 42C, 42D, and 42E, various lenses such as convex lenses and concave lenses can be used, and their curved surfaces may be spherical or aspherical. On the other hand, the camera module is composed of the above-described lens unit 41 and an image pickup device 44 such as a CCD image sensor or a CMOS image sensor that is disposed on the optical axis of this lens unit 41 and picks up an image of an object through the lens unit 41.

Figure 5:
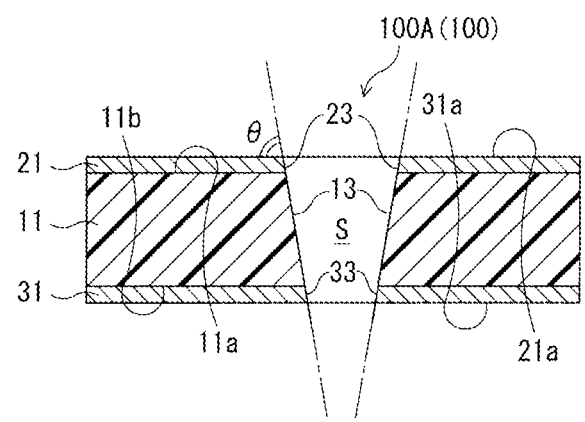
FIG. 5 is a cross-sectional view schematically showing the light-blocking ring for optical equipment (multilayer light-blocking film) in one embodiment.

FIG. 5 is a cross-sectional view schematically showing the light-blocking ring 100A for optical equipment. The light-blocking ring 100A for optical equipment is obtained by stamping the multilayer light-blocking film 100 in the first embodiment described above into a ring shape (hollow tubular shape). Therefore, the light-blocking ring 100A for optical equipment has the same multilayer structure as the multilayer light-blocking film 100 in the first embodiment described above.

The light-blocking ring 100A for optical equipment is a light-blocking plate whose outer shape is a ring shape (hollow tubular shape) in which a cylindrical hollow portion S is provided at a generally central position in a planar view. In this embodiment, the above-described inclined end surfaces 12, 22, and 32 are not provided on the outer peripheral side surface of the light-blocking ring 100A for optical equipment, and these outer peripheral side surfaces are formed in a rectangular shape in a cross-sectional view. In other words, in the light-blocking ring 100A for optical equipment in this embodiment, the inclination angle θ of the outer peripheral end surface is 90°. On the other hand, in the light-blocking ring 100A for optical equipment in this embodiment, inclined end surfaces 13, 23, and 33 corresponding to the above-described inclined end surfaces 12, 22, and 32 are provided on the inner peripheral end surface. The light-blocking rings 100B and 100C for optical equipment have the same configuration as the light-blocking ring 100A for optical equipment except that the size of the outer diameter and the size of the outer diameter of the hollow portion S are each different, and redundant description is omitted here.

Operation

Also in the light-blocking rings 100A, 100B, and 100C for optical equipment in this embodiment, the light-blocking layer 21 and the light-blocking layer 31 having an optical density of 2.5 or more in total, wherein the difference in 60-degree glossiness is 0.1% or more and 9.9% or less are adopted. Therefore, by using these as light-blocking members for optical equipment such as a lens unit or a camera module, unnecessary incident light and reflected light can be removed, the occurrence of halation, lens flare, a ghost, and the like can be prevented, and the image quality of a picked-up image can be improved.

Moreover, in the above-described multilayer structure, the difference in 60-degree glossiness between the light-blocking layer 21 and the light-blocking layer 31 exposed on the front and back surfaces is adjusted at 0.1% or more and 9.9% or less, and therefore the discrimination of the front and back surfaces of the light-blocking rings 100A, 100B, and 100C for optical equipment can be easily performed in a noncontact manner, that is, visually, based on the differences in glossy feeling and luster between the light-blocking layer 21 and the light-blocking layer 31. Therefore, for the lens unit 41 and the camera module 51 using these light-blocking rings 100A, 100B, and 100C for optical equipment, also during their storage and incorporation, manufacturing failure such as poor incorporation based on the false recognition of the front and back surfaces is inhibited.

Furthermore, in the light-blocking ring 100A for optical equipment in this embodiment, the inclined end surfaces 13, 23, and 33 are provided, and the discriminability of the light-blocking layers 21 and 31 is further increased. By providing the inclined end surfaces 13, 23, and 33 on the end surface on the optical axis side (inner peripheral end surface) in this manner, unnecessary reflected light can be removed, the occurrence of halation, lens flare, a ghost, and the like can be prevented, and the image quality of a picked-up image can be improved.

Modifications

The present invention can be carried out by making any changes without departing from the spirit thereof. For example, for the outer shape of the multilayer light-blocking film 100 (the light-blocking ring 100A, 100B, or 100C for optical equipment), for example, any shape such as a polygonal shape such as a rectangular shape, a square shape, or a hexagonal shape, an elliptical shape, or an irregular shape in a planar view can be adopted. In addition, also for the shape of the hollow portion S of the light-blocking ring 100A, 100B, or 100C for optical equipment, the hollow portion S is formed in a circular shape in a planar view in this embodiment, but its outer shape is not particularly limited. For example, any shape such as a polygonal shape such as a rectangular shape, a square shape, or a hexagonal shape, an elliptical shape, or an irregular shape in a planar view can be adopted. Further, in this embodiment, the above-described inclined end surfaces 12, 22, and 32 are not provided, but either one or both of the inclined end surface 12 and the inclined end surfaces 22 and 32 can be appropriately provided as needed. Further, in the above-described embodiment, a mode in which the light-blocking layer 21 and the light-blocking layer 31 are provided on the front and back of the substrate film 11 has been shown, but a multi-layer structure (two-layer structure) of the light-blocking layer 21 and the light-blocking layer 31 may be provided without providing the substrate film 11. In addition, the above-described multilayer structure should be in a state in which the light-blocking layer 21 and the light-blocking layer 31 are exposed on the front and back surfaces during the handling of the multilayer light-blocking film 100, and additional layers such as protective layers and other light-blocking layers may be formed so as to cover the exposed surfaces of the light-blocking layer 21 and the light-blocking layer 31, during subsequent use and mounting. Further, the light-blocking layer 21 or 31 may be formed of two or more light-blocking films. For example, a multilayer light-blocking layer in which a light-blocking film 21*a* and a light-blocking film 21*b* are layered can be applied as the light-blocking layer 21. The same applies to the light-blocking layer 31. At this time, the above-described various performances and physical properties required of the light-blocking layer 21 should be satisfied as the layered body of the light-blocking film 21*a* and the light-blocking film 21*b*. The same applies to the light-blocking layer 31. In the above embodiment, an example in which the inclined end surface 12 is provided so that the film width of the substrate film 11 increases from the light-blocking layer 21 toward the light-blocking layer 31 has been shown, but the inclined end surface 12 may be provided so that the film width of the substrate film 11 increases from the light-blocking layer 31 toward the light-blocking layer 21.

INDUSTRIAL APPLICABILITY

The present invention can be widely and effectively used as a high-performance light-blocking member in the precision machine field, the semiconductor field, the optical equipment field, electronic equipment, and the like. Especially, the present invention can be particularly effectively used as a light-blocking member used in a lens unit, a camera module, a sensor unit or the like mounted in a high-performance single-lens reflex camera, a compact camera, a video camera, a cellular phone, a projector, in-vehicle camera, in-vehicle sensor, optical sensor or the like.

REFERENCE SIGNS LIST

11 . . . substrate film
11*a* . . . surface (major surface)
11*b* . . . surface (major surface)
12 . . . inclined end surface
13 . . . inclined end surface
21 . . . light-blocking layer
21*a* . . . surface (major surface)
22 . . . inclined end surface
23 . . . inclined end surface
31 . . . light-blocking layer
31*a* . . . surface (major surface)
32 . . . inclined end surface
33 . . . inclined end surface
41 . . . lens unit
42 . . . lens group
42A . . . lens
42B . . . lens
42C . . . lens
42D . . . lens
42E . . . lens
43 . . . holder
43*a* . . . height difference portion
43*b* . . . height difference portion
43*c* . . . height difference portion
44 . . . image pickup device
51 . . . camera module
100 . . . multilayer light-blocking film
100A . . . light-blocking ring for optical equipment (multilayer light-blocking film)
100B . . . light-blocking ring for optical equipment (multilayer light-blocking film)
100C . . . light-blocking ring for optical equipment (multilayer light-blocking film)
200 . . . web roll
θ . . . inclination angle
S . . . hollow portion
MD . . . flow direction
TD . . . vertical direction

The invention claimed is:

1. A multilayer light-blocking film for optical equipment, comprising:
a multilayer structure comprising at least a first light-blocking layer and a second light-blocking layer, wherein
the first light-blocking layer and the second light-blocking layer have an optical density of 2.5 or more in total,
the 60-degree glossiness of the first light-blocking layer is 0.01% or more and 5% or less,
the 60-degree glossiness of the second light-blocking layer is 10% or more and less than 15%, and
a difference between a 60-degree glossiness of the first light-blocking layer and a 60-degree glossiness of the second light-blocking layer is more than 5% and 9.9% or less.

2. The multilayer light-blocking film for optical equipment according to claim 1, wherein
the first light-blocking layer and/or the second light-blocking layer have inclined end surfaces so that a film width increases from the first light-blocking layer toward the second light-blocking layer, and the inclined end surface is exposed in a planar view seen from a normal direction of a major surface of the first light-blocking layer.

3. The multilayer light-blocking film for optical equipment according to claim 2, wherein
an inclination angle between the major surface of the first light-blocking layer or a major surface of the second light-blocking layer and the inclined end surface is 10 to 87°.

4. The multilayer light-blocking film for optical equipment according to claim 1, wherein
a hollow portion is provided in the first light-blocking layer and/or the second light-blocking layer, and the first light-blocking layer and/or the black light-blocking layer each have an inclined end surface on an inner periphery of the hollow portion.

5. The multilayer light-blocking film for optical equipment according to claim 1, wherein
an optical density of the first light-blocking layer is 1.5 or more and less than 2.5, and
an optical density of the second light-blocking layer is 1.5 or more and 6.0 or less.

6. The multilayer light-blocking film for optical equipment according to claim 1, comprising:
a multilayer structure comprising at least a substrate film, the first light-blocking layer provided on one major surface side of the substrate film, and the second light-blocking layer provided on the other major surface side of the substrate film.

7. The multilayer light-blocking film for optical equipment according to claim 6, wherein the substrate film has a total light transmittance of 80.0 to 99.9%.

8. The multilayer light-blocking film for optical equipment according to claim 6, wherein the substrate film has a thickness of 0.5 µm or more and 50 µm or less.

9. A light-blocking ring for optical equipment, having a ring-shaped outer shape, and
comprising the multilayer light-blocking film for optical equipment according to claim 1.

10. A lens unit comprising a plurality of lenses and at least one or more light-blocking plates stacked in an optical axis direction of the lenses, wherein
at least one or more of the light-blocking plates comprise the light-blocking ring for optical equipment according to claim 9.

11. A camera module comprising at least: a lens unit comprising a plurality of lenses and at least one or more light-blocking plates stacked in an optical axis direction of the lenses; and an image pickup device for picking up an image of an object through the lens unit, wherein
at least one or more of the light-blocking plates comprise the light-blocking ring for optical equipment according to claim 9.

12. A lens unit comprising a plurality of lenses and at least one or more light-blocking plates stacked in an optical axis direction of the lenses, wherein
at least one or more of the light-blocking plates comprise the multilayer light-blocking film for optical equipment according to claim 1.

13. A camera module comprising at least: a lens unit comprising a plurality of lenses and at least one or more light-blocking plates stacked in an optical axis direction of the lenses; and an image pickup device for picking up an image of an object through the lens unit, wherein
at least one or more of the light-blocking plates comprise the multilayer light-blocking film for optical equipment according to claim 1.

14. A multilayer light-blocking film for optical equipment, comprising:
a multilayer structure comprising at least a first light-blocking layer and a second light-blocking layer, wherein
the first light-blocking layer and the second light-blocking layer have an optical density of 2.5 or more in total, in which an optical density of the first light-blocking layer is 1.5 or more and less than 2.5 and an optical density of the second light-blocking layer is 1.5 or more and 6.0 or less,
the 60-degree glossiness of the first light-blocking layer is 0.01% or more and 5% or less,
the 60-degree glossiness of the second light-blocking layer is 0.5% or more and less than 10%, and
a difference between a 60-degree glossiness of the first light-blocking layer and a 60-degree glossiness of the second light-blocking layer is 0.1% or more and 9.9% or less.

15. The multilayer light-blocking film for optical equipment according to claim 14, wherein
the first light-blocking layer and/or the second light-blocking layer have inclined end surfaces so that a film width increases from the second light-blocking layer toward the first light-blocking layer, and
the inclined end surface is exposed in a planar view seen from a normal direction of a major surface of the second light-blocking layer.

16. The multilayer light-blocking film for optical equipment according to claim 14, comprising:
a multilayer structure comprising at least a substrate film, the first light-blocking layer provided on one major surface side of the substrate film, and the second light-blocking layer provided on the other major surface side of the substrate film.

17. A light-blocking ring for optical equipment, having a ring-shaped outer shape, and
comprising the multilayer light-blocking film for optical equipment according to claim 14.

18. A lens unit comprising a plurality of lenses and at least one or more light-blocking plates stacked in an optical axis direction of the lenses, wherein
at least one or more of the light-blocking plates comprise the light-blocking ring for optical equipment according to claim 17.

19. A camera module comprising at least: a lens unit comprising a plurality of lenses and at least one or more light-blocking plates stacked in an optical axis direction of the lenses; and an image pickup device for picking up an image of an object through the lens unit, wherein
at least one or more of the light-blocking plates comprise the light-blocking ring for optical equipment according to claim 17.

20. A lens unit comprising a plurality of lenses and at least one or more light-blocking plates stacked in an optical axis direction of the lenses, wherein
at least one or more of the light-blocking plates comprise the multilayer light-blocking film for optical equipment according to claim 14.

21. A camera module comprising at least: a lens unit comprising a plurality of lenses and at least one or more light-blocking plates stacked in an optical axis direction of the lenses; and an image pickup device for picking up an image of an object through the lens unit, wherein at least one or more of the light-blocking plates comprise the multilayer light-blocking film for optical equipment according to claim 14.

\* \* \* \* \*